3,517,050
ESTER AND AMIDE DERIVATIVE OF (3-TRIFLUOROMETHYLPHENOXY) (4 - HALOPHENYL)ACETIC ACID

William A. Bolhofer, Frederick, Pa., assignor to Merck & Co., Inc., Rahway, N.J., a corporation of New Jersey
No Drawing. Filed Oct. 3, 1966, Ser. No. 583,937
Int. Cl. C07c 69/76
U.S. Cl. 260—473      12 Claims

ABSTRACT OF THE DISCLOSURE

Esters and amides of (3-trifluoromethylphenoxy)(4-halophenyl)acetic acid which are prepared by treating a (3-trifluoromethylphenoxy)(4-halophenyl)acetyl halide with an appropriate alcohol or amine. The products thus obtained reduce the concentration of cholesterol, triglycerides and other lipids in blood serum.

---

This invention relates to a new class of chemical compounds which can be described generally as ester and amide derivatives of (3-trifluoromethylphenoxy)(4-halophenyl)acetic acid and, also, to a novel method for their preparation.

Studies show that cholesterol and triglycerides play a major role in the formation of atherosclerotic plaques by accelerating the deposition of blood lipids in the arterial wall. It is the purpose of this invention to disclose a new class of chemical compounds which effectively reduce the concentration of cholesterol, triglycerides and other lipids in blood serum and, consequently, ameliorate conditions associated with blood lipid deposition.

The instant (3-trifluoromethylphenoxy)(4-halophenyl) acetic acid esters and amides are products having the following general formula:

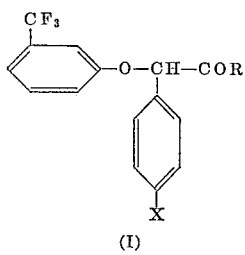

(I)

wherein R is mononuclear lower aralkoxy, for example, phenyl-lower alkoxy such as benzyloxy, phenethyloxy, etc.; di-lower alkylamino-lower alkoxy and the nontoxic, pharmacologically acceptable acid addition salts thereof, for example, dimethylaminoethoxy, diethylaminoethoxy, diethylaminoethoxy·hydrochloride, diethylaminoethoxy· citrate, diethylaminopropoxy, etc.; lower alkanamido-lower alkoxy, for example, formamidoethoxy, acetamidoethoxy, acetamidopropoxy, etc.; benzamido-lower alkoxy, for example, benzamidoethoxy, benzamidopropoxy; etc.; ureido-lower alkoxy, for example, ureidoethoxy, 1-methyl-2-ureidoethoxy, etc.; N'-lower alkyl-ureido-lower alkoxy, i.e., $R^1NH-CONH-C_nH_{2n}-O-$ wherein $R^1$ represents lower alkyl and $n$ is an integer having a value of from 1 to about 5, for example, N'-ethyl-ureidoethoxy, N'-ethyl-ureidopropoxy, etc.; carbamoyl-lower alkoxy, for example, carbamoylmethoxy, carbamoylethoxy, etc.; halophenoxy substituted lower alkoxy, for example, 2-(4-chlorophenoxy)ethoxy, 2 - (4 - chlorophenoxy)-2-methylpropoxy, etc.; carbamoyl substituted phenoxy, for example, 2-carbamoylphenoxy, etc.; carboxy-lower alkylamino and the nontoxic, pharmacologically acceptable amine addition salts thereof, for example, carboxymethylamino, carboxymethylamino·cyclohexylamine salt, carboxyethylamine, etc.; N,N-di-lower alkylamino-lower alkylamino and the nontoxic, pharmacologically acceptable acid solution salts thereof, for example, N,N-dimethylaminoethylamino·hydrochloride, N,N-diethylaminoethylamino, N,N-diethylaminoethylamino·citrate, N,N-diethylaminopropylamino·citrate, etc.; halo substituted lower alkylamino, for example, 2-chloroethylamino, 4-chlorobutylamino, etc.; hydroxy substituted lower alkylamino, for example, 2-hydroxyethylamino, 3-hydroxypropylamino, etc.; lower alkanoyloxy substituted lower alkylamino, for example, acetoxyethylamino, acetoxypropylamino, etc.; ureido; lower alkoxycarbonylamino, for example, methoxycarbonylamino (i.e., $-NHCOOCH_3$), ethoxycarbonylamino (i.e., $-NHCOOC_2H_5$), etc.; and X is halogen, for example, chloro, bromo, fluoro or iodo.

A preferred embodiment of this invention relates to (3 - trifluoromethylphenoxy)(4 - halophenyl)acetic acid esters of the following formula:

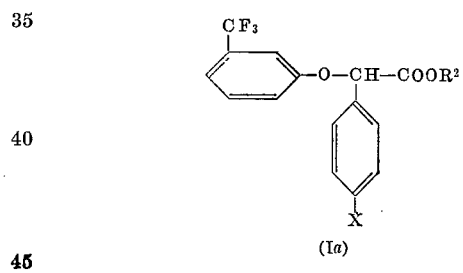

(Ia)

wherein $R^2$ is phenyl-lower alkyl, for example, benzyl, etc.; lower alkanamido-lower alkyl, for example, acetamidoethyl, etc. or benzamido-lower alkyl, for example, benzamidoethyl, etc., and X is as defined above. The foregoing class of compounds exhibits particularly good hypocholesterolemic and hypolipemic activity and represents a preferred subgroup within the scope of this invention.

The products (I) of this invention are conveniently prepared by treating a (3-trifluoromethylphenoxy)(4-halophenyl)acetyl halide with an appropriate alcohol or amine. Preferably, the reaction is conducted in a solvent which is substantially inert with respect to the reactants, as, for example, in ether, dimethylformamide, tetrahydrofuran, etc. In general, the process may be conducted at ambient temperatures but, in some instances, the reaction is facilitated by the application of heat as. for example, by heating at temperatures of about 80–100°

C. The following equation illustrates this method of preparation:

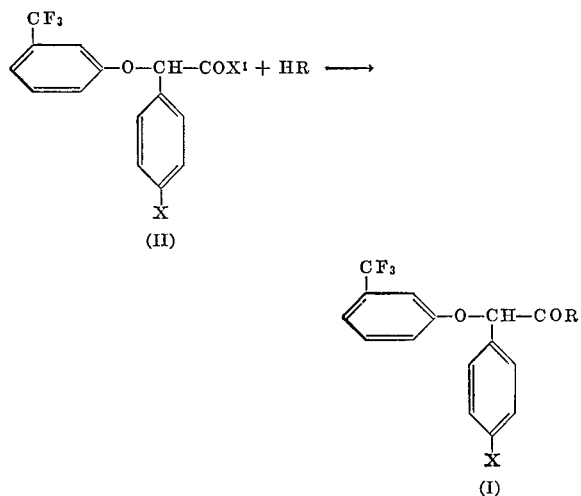

wherein $X^1$ is halogen, for example, chloro, bromo, etc. and R and X are as defined above. Some of the foregoing products are obtained in the form of liquids; these include, for example, products corresponding to the foregoing Formula I wherein R represents a di-lower alkylamino-lower alkoxy, di-lower alkylamino-lower alkylamino or carboxy-lower alkylamino radical. By forming the salts of such products as, for example, by treating the products (I) with a suitable acid or base, crystalline derivatives in the form of the corresponding acid addition salts may be isolated and then purified by conventional means.

The N-(lower alkanoyloxyalkyl)(3-trifluoromethylphenoxy)(4-halophenyl)acetamides (IV, infra) of this invention, corresponding to planar Formula I (supra) wherein R represents a lower alkanoyloxyalkylamino radical, may also be prepared by the alternate method of treating an N-(hydroxyalkyl)(3-trifluoromethylphenoxy) (4 - halophenyl)acetamide (III, infra) with suitable acylating agent as, for example, with a lower alkanoyl halide such as acetyl chloride, etc. The reaction may be conducted in any medium which is suitably inert with respect to the reactants as, for example, in ether, etc. The following equation illustrates this process:

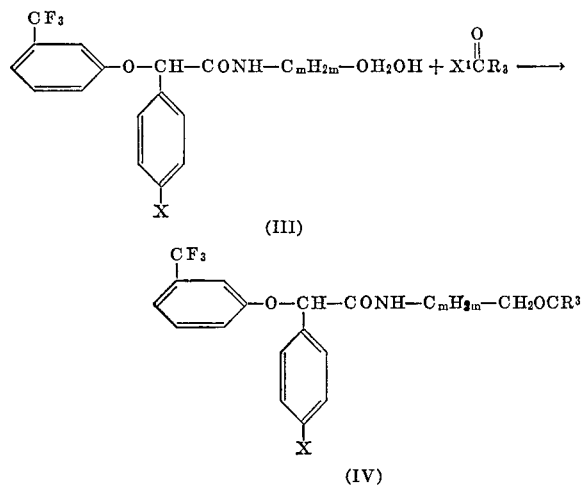

wherein $R^3$ is lower alkyl; $m$ is an integer having a value of from 1 to about 4 and X and $X^1$ are as defined above. The N-(hydroxyalkyl) (3-trifluoromethylphenoxy) (4-halophenyl)acetamides (III) employed as the starting materials in the foregoing reaction are novel compounds which can be obtained by treating (3-trifluoromethylphenoxy) (4-halophenyl)acetyl halide with an appropriate hydroxyalkylamine according to the first-described principal method for preparing the products of this invention.

Also, in lieu of treating a (3-trifluoromethylphenoxy) (4-halophenyl)acetyl halide with a di-lower alkylaminoalkanol, according to the first principal method described above, the 2-di-lower alkylamino-lower alkyl (3-trifluoromethylphenoxy) (4-halophenyl)acetates of this invention may be obtained by the reaction of the corresponding (3-trifluoromethylphenoxy) (4-halophenyl)acetic acid with an appropriate di-lower alkylamino-lower alkyl halide. The reaction is advantageously conducted with the application of heat as, for example, by heating the reaction mixture under reflux for several hours. The following equation illustrates this method of preparation:

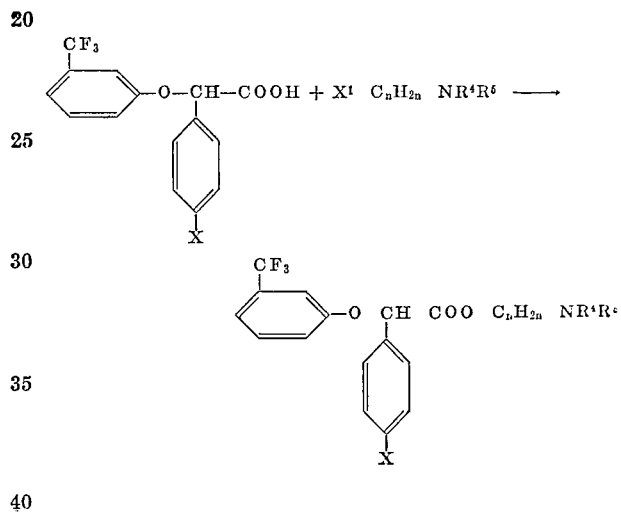

wherein X, $X^1$ and $n$ are as defined above and $R^4$ and $R^5$ represent lower alkyl, for example, methyl, ethyl, etc.

The instant (3-trifluoromethylphenoxy) (4-halophenyl))acetic acid esters and amides (I) when obtained as crystalline solids may be purified by recrystallization from a suitable solvent or mixture of solvents, such as ethyl alcohol, isopropyl alcohol, methylcyclohexane, acetonitrile, n-butyl chloride, isopropyl ether, ethyl acetate, etc.

The (3-trifluoromethylphenoxy) (4-halophenyl)acetyl halides which are employed as starting materials in the process of this invention are obtained from their corresponding 4-halophenylacetonitrile precursors (V, infra) by treating the latter with an aqueous solution of a base, followed by treatment with a strong acid such as concentrated sulfuric acid, to yield the corresponding 4-halophenylacetic acid (VI, infra); the acid intermediate thus obtained is then allowed to react with thionyl chloride and brominated and then esterified with a lower alkanol to yield the corresponding (4-halophenyl)bromoacetate (VII, infra), which ester is then treated with 3-trifluoromethylphenol in the presence of a sodium alkoxide-lower alkanol mixture to yield (3-trifluoromethylphenoxy) (4-halophenyl)acetate (VIII, infra); the intermediate (VIII) thus obtained is then hydrolyzed to the corresponding acid (IX, infra) by conventional means, i.e., by treatment with a base and then with an acid, and, lastly, the said (IX, infra) is treated with an halogenating agent, such as thionyl chloride, to obtain the desired (3-trifluoromethylphenoxy) (4-halophenyl)acetic acid (IIa). The following equations, wherein the lower alkanol and halogenating agent employed are methanol and thionyl chloride, respectively, illustrate the process. However, it is to be understood that other alkanols such as ethanol, propanol, isopropanol, etc. and other halogenating agents may also be employed in an otherwise similar process to obtain analogous (3-trifluoromethylphenoxy) (4-halophenyl)acetic acid halide derivatives (II and IIa):

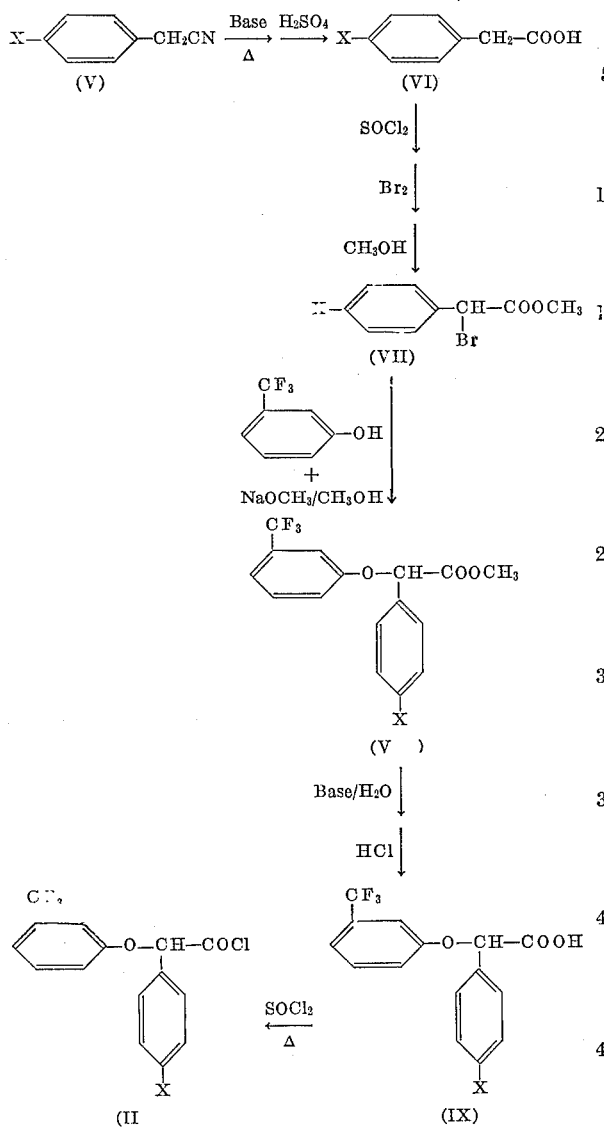

wherein X is as defined above.

There is no clear agreement about the actual role of cholesterol and triglyceride synthesis in the localization of atherosclerotic plaques, but numerous studies support the concept that cholesterol and triglycerides play a major role in the pathogenesis of atherosclerosis because along with other lipids and fibrin they accumulate in the arterial intima and subintima and produce arterial corrosion.

Since cholesterol and triglycerides are present to some extent in all ordinary diets and since they are also synthesized by body organs from intermediates of metabolic origin, the development of some chemotherapeutic agent which will induce a significant reduction in the serum cholesterol and triglyceride level has been found desirable. To this end the (3-trifluoromethylphenoxy) (4-halophenyl)acetic acid esters and amides of this invention were synthesized, tested and found to exhibit good hypocholesterolemic and hypolipemic activity. Furthermore, certain products of this invention, for example, 2-acetamidoethyl (3 - trifluoromethylphenoxy) (4-chlorophenyl) acetate, benzyl (3 - trifluoromethylphenoxy) (4 - chlorophenyl)acetate and 2 - benzamidoethyl (3 - trifluoromethylphenoxy) (4-chlorophenyl)acetate combine good hypocholesterolemic and hypolipemic activity with the added advantage of inducing little or no gastric irritation.

The examples which follow illustrate the (3-trifluoromethylphenoxy) (4-halophenyl)acetic acid esters and amides (I) of this invention and, also, the methods by which they are prepared. However, the examples are illustrative only and it will be apparent to those having ordinary skill in the art that all of the instant products may be prepared in an analogous manner by substituting the appropriate starting materials for those set forth in the examples.

EXAMPLE 1

2-acetamidoethyl (3-trifluoromethylphenoxy) (4-chlorophenyl)acetate

Step A: 4-chlorophenylacetic acid.—4-chlorophenylacetonitrile (151.5 g., 1.0 mole) and 1 liter of 20% aqueous sodium hydroxide are mixed and heated on a steam bath with stirring for 20 hours. The resulting solution is cooled and extracted with ether to remove a small amount of oily material. The aqueous solution then is acidified with concentrated sulfuric acid and cooled to 5° C. The crystalline product is collected, washed with water, dried and recrystallized from 700 ml. of 70% ethanol to yield 165 g. (97%) of 4-chlorophenylacetic acid, M.P. 103–105° C.

Step B: Methyl (4-chlorophenyl)bromoacetate.—4-chlorophenylacetic acid (170 g., 1.0 mole) and thionyl chloride (150 g., 1.25 mole) are placed in a 2-liter flask fitted with a stirrer, reflux condenser and dropping funnel. The mixture is stirred and heated at reflux for two hours with stirring while bromine (160 g., 1.0 mole) is added from the dropping funnel over a three-hour period. Heating under reflux is continued for 20 hours. The reaction mixture then is cooled to room temperature and methyl alcohol (1 liter) is added, slowly at first, and then more rapidly as the initial exothermic reaction subsides. The excess methanol is evaporated in vacuo and the residue is treated with water. Ether is used to extract the product and the extract is dried over magnesium sulfate and distilled. There is thus obtained 212 g. (80%) of methyl (4-chlorophenyl) bromoacetate as a colorless oil, B.P. 96–100° C./1 mm.

Step C: Methyl (3-trifluoromethylphenoxy) (4-chlorophenyl)acetate.—3-trifluoromethylphenol 20.4 g., 0.125 mole) in 25 ml. of methyl alcohol is added to a solution of 0.125 mole of sodium methoxide in 125 ml. of methyl alcohol. To this is added a solution of 31.9 g. (0.125 mole) of methyl (4-chlorophenyl)bromoacetate in 25 ml. of methanol. The reaction is heated under reflux for 15 hours and then concentrated in vacuo. Ether (500 ml.) and water (150 ml.) are added to the residue and the organic layer is separated, washed with dilute sodium hydroxide and water and then dried and evaporated. The residue is recrystallized from 70 ml. of methylcyclohexane to yield 28.0 g. (65%) of methyl (3-trifluoromethylphenoxy) (4-chlorophenyl)acetate, M.P. 86–88° C.

Step D: (3-trifluoromethylphenoxy) (4-chlorophenyl) acetic acid.—A solution of 28.0 g. (0.0812 mole) of methyl (3-trifluoromethylphenoxy) (4-chlorophenyl)acetate in 220 ml. of a 90% ethanol solution containing 18.2 g. (0.325 mole) of potassium hydroxide is heated under reflux for six hours. After evaporation of the solvent in vacuo, 750 ml. of water is added to the residue. The solution is treated with charcoal, filtered, and acidified with hydrochloric acid. The (3-trifluoromethylphenoxy) (4-chlorophenyl)acetic acid, M.P. 91–96° C. thus obtained separates as an oil which soon solidifies. The product is recrystallized from 75 ml. of methylcyclohexane to yield 23.4 g. (87.3%) of (3-trifluoromethylphenoxy) (4-chlorophenyl)acetic acid, M.P. 99–101° C.

Step E: (3 - trifluoromethylphenoxy) (4-chlorophenyl) acetyl chloride.—Thionyl chloride (44.5 g., 0.375 mole) is added over a five-minute period to a suspension of (3-trifluoromethylphenoxy) (4-chlorophenyl)acetic acid (100 g., 0.30 mole) in 125 ml. of chloroform. The mixture is stirred at room temperature for 30 minutes and then heated under reflux for six hours. As soon as the temperature reaches the boiling point a clear homogeneous solution results. At the end of the reaction period, the solvent and volatile reaction products are removed by evaporation in vacuo. High purity (3-trifluoromethylphenoxy) (4-chlorophenyl)acetyl chloride (105 g.) is obtained as a residual oil in almost theoretical yield.

Step F: 2-acetamidoethyl (3 - trifluoromethylphenoxy) (4-chlorophenyl)acetate.—A solution of (3-trifluoromethylphenoxy) (4-chlorophenyl)acetyl chloride (20.9 g., 0.06 mole) in 25 ml. of ether is added to a mixture of acetamidoethanol (6.19 g., 0.06 mole), dimethylformamide (70 ml.) and pyridine (5.4 ml.) at 5° C. over a 30-minute period. The reaction mixture is stirred and protected from atmospheric moisture during the addition. After stirring an additional hour at 5° C., the reaction mixture is warmed to room temperature and allowed to stand for 16 hours. Water (300 ml.) and ether (100 ml.) are added and the resulting aqueous layer is separated and extracted twice with 100 ml. of ether. The ether extracts are combined and concentrated to yield 23.2 g. of crystalline residue, M.P. 82–89° C. Recrystallization from isopropyl alcohol yields 15.3 g. of 2-acetamidoethyl (3-trifluoromethylphenoxy) (4-chlorophenyl)acetate, M.P. 93.5–95.5° C.

Analysis.—Calculated for $C_{19}H_{17}ClF_3NO_4$ (percent): C, 54.88; H, 4.12; N, 3.37. Found (percent): C, 54.82; H, 4.19; N, 3.35.

EXAMPLE 2

2-benzamidoethyl (3-trifluoromethylphenoxy) (4-chlorophenyl)acetate

By substituting benzamidoethanol (7.91 g., 0.06 mole) for the acetamidoethanol of Example 1, Step F, and following the procedure described therein, there is obtained a crystalline residue upon evaporation of the ether solution. The crystalline product thus obtained is recrystallized from methylcyclohexane to obtain pure 2-benzamidoethyl (3-trifluoromethylphenoxy) (4-chlorophenyl)acetate, M.P. 90–92° C.

Analysis.—Calculated for $C_{24}H_{19}ClF_3NO_4$ (percent): C, 60.32; H, 4.01; N, 2.93. Found (percent): C, 60.22; H, 3.77; N, 2.95.

EXAMPLE 3

2-diethylaminoethyl (3-trifluoromethylphenoxy) (4-chlorophenyl)acetate and citrate salt 2-diethylaminoethyl chloride (8.29 g., 0.06 mole) is added to a solution of (3-trifluoromethylphenoxy) (4-chlorophenyl)acetic acid (19.8 g., 0.06 mole) in 250 ml. of isopropyl alcohol. The solution is heated under reflux for 16 hours and then the solvent is evaporated in vacuo. The residue is dissolved in ether and the solution extracted with dilute potassium bicarbonate solution and then with water. The ether solution is dried over anhydrous sodium sulfate and the ether is evaporated in vacuo. 2 - diethylaminoethyl (3 - trifluoromethylphenoxy) (4 - chlorophenyl)acetate (21.0 g.) remains as a viscous oily residue.

The citrate salt of 2-diethylaminoethyl (3-trifluoromethylphenoxy) (4-chlorophenyl)acetate is prepared by reaction the said oily product with a molecular equivalent amount of citric acid in an ethyl alcohol solution. A crystalline product precipitates and the product thus obtained is recrystallized from acetonitrile to yield 2-diethylaminoethyl (3-trifluoromethylphenoxy) (4 - chlorophenyl) acetate, citrate salt, M.P. 116.5–119° C.

Analysis.—Calculated for $C_{21}H_{23}ClF_3NO_3 \cdot C_6H_8O_7$ (percent): C, 52.13; H, 5.02; N, 2.25. Found (percent): C, 51.94; H, 5.12; N, 2.30.

EXAMPLE 4

2-ureidoethyl (3-trifluoromethylphenoxy) (4-chlorophenyl)acetate

A solution of (3-trifluoromethylphenoxy) (4-chlorophenyl)acetyl chloride (10.5 g., 0.03 mole) in 25 ml. of ether is added to a mixture of 2-ureidoethanol (3.12 g., 0.03 mole), 75 ml. of dimethylformamide and 3 ml. of pyridine over a 30-minute period at 5° C. Stirring is continued at this temperature for another 30 minutes and then the mixture is stirred for four hours at room temperature. Water (400 ml.) and ether (125 ml.) are added and the layers separated. The aqueous layer is extracted twice with 100 ml. of ether and the ether extracts are combined. The resulting solution is extracted with water, dried over anhydrous sodium sulfate and the ether is evaporated under reduced pressure. A crystalline residue (11.0 g., M.P. 101–107° C.) is obtained and then recrystallized from n-butyl chloride to yield pure 2-ureidoethyl (3-trifluoromethylphenoxy) (4-chlorophenyl)acetate, M.P. 111–113° C.

Analysis.—Calculated for $C_{18}H_{16}ClF_3N_2O_4$ (percent): C, 51.87; H, 3.87; N, 6.72. Found (percent): C, 52.13; H, 3.92; N, 6.65.

EXAMPLE 5

2-(N'-ethylureido)ethyl (3-trifluoromethylphenoxy) (4-chlorophenyl)acetate

By substituting an equivalent amount of 2-(N'-ethylureido)ethanol for the 2-ureidoethanol of Example 4 and following the procedure described therein, a crystalline residue, MP. 76–83° C,. is obtained. Recrystallization from isopropyl ether yields 2-(N'-ethylureido)ethyl (3-trifluoromethylphenoxy)(4 - chlorophenyl)acetate, M.P. 93–95° C.

Analysis.—Calculated for $C_{20}H_{20}ClF_3N_2O_4$ (percent): C, 54.00; H, 4.53; N, 6.30. Found (percent): C, 53.93; H, 4.54; N, 6.23.

EXAMPLE 6

Carbamoylmethyl (3-trifluoromethylphenoxy) (4-chlorophenyl)acetate

By substituting an equivalent amount of glycolamide for the acetamidoethanol of Example 1, Step F, and following the procedure described therein a crystalline residue, MP. 81–90° C. is obtained upon evaporation of the ether extracts obtained according to the reaction workup. Recrystallization of the residue from n-butyl chloride yields carbamoylmethyl 3 -trifluoromethylphenoxy)4-chlorophenyl)acetate, M.P. 96–98° C.

Analysis.—Calculated for $C_{17}H_{13}ClF_3NO_4$ (percent): C, 52.66; H, 3.38; N, 3.61. Found (percent): C, 52.62; H, 3.37; N, 3.58

EXAMPLE 7 o-Carbamoylphenyl (3-trifluoromethylphenoxy) (4-chlorophenyl)acetate

By substituting an equivalent amount of salicylamide for the acetamidoethanol of Example 1, Step F, and following the procedure described therein a crystalline product, MP. 149–159° C. is obtained upon evaporation of the ether extracts. Recrystallization from acetonitrile yields pure o-carbamoylphenyl (3-trifluoromethylphenoxy) (4-chlorophenyl)acetate, M.P. 164.5–166.5° C.

Analysis.—Calculated for $C_{22}H_{15}ClF_3NO$ (percent): C, 58.74; H, 3.36; N, 3.11. Found (percent): C, 58.82; H, 3.49; N, 3.16.

EXAMPLE 8

2-(4-chlorophenoxy)-2-methylpropyl (3-trifluoromethylphenoxy) (4-chlorophenyl)acetate Step A: 2-(4-chlorophenoxy)-2-methyl-1-propanol.—A two-liter, three-neck, round-bottom flask fitted with a mechanical stirrer, a reflux condenser with a calcium chloride tube and a dropping funnel, is swept out with dry nitrogen gas and flame dried. Into this system is placed 4.5 g. (0.12 mole) of finely powdered lithium aluminum hydride and 400 ml. of anhydrous ethyl ether. 4-chlorophenoxyisobutyric acid (15.0 g., 0.07 mole) dissolved in 100 ml of anhydrous ethyl ether is placed in the dropping funnel and added dropwise to the stirred suspension of the lithium aluminum hydride. The reaction is exothermic and the acid solution is added at a rate sufficient to maintain gentle reflux of the solvent. The addition requires about one hour. When the addition is complete, the mixture is stirred, heated at reflux for one hour and excess lithium aluminum hydride is decomposed by dropwise addition of anhydrous ethyl acetate until no further reaction occurs. Finally, the reaction mixture is decomposed by the cautious addition of 200 ml. of water. The water-ether mixture is stirred 15 minutes and then acidified with dilute hydrochloric acid. The layers are separated, and the ether phase is washed well with saturated sodium bicarbonate solution and water. After drying over anhydrous magnesium sulfate, the ether is evaporated on steam and the residue twice distilled in vacuo. There is thus obtained 12.5 g. (90%) of 2-(4-chlorophenoxy)-2-methyl-1-propanol as a colorless oil boiling at 100–101° C./0.5 mm. Hg; $n_D^{24}$ 1.5305.

Step B: 2-(4-chlorophenoxy)-2-methylpropyl (3-trifluoromethylphenoxy)(4 - chlorophenyl)acetate.—2 - (4-chlorophenoxy)-2-methyl-1-propanol (8.03 g., 0.04 mole) is dissolved in a mixture of 70 ml. of ether and 4 ml. of pyridine. The solution is cooled to 5° C. and a solution of (3 - trifluoromethylphenoxy)(4 - chlorophenyl)acetyl chloride (13.96 g., 0.04 mole) in 30 ml. of ether is added over a 25-minute period. The mixture is stirred at 5° C. for 30 minutes and then is allowed to stand for four hours at room temperature. Water (200 ml.) and ether (200 ml.) are then added and the layers are separated. The ether solution is washed with water, dried over anhydrous sodium sulfate and evaporated. An oily residue is obtained which then is distilled at 215–218° C. in a short-path still at 0.1 mm. to yield 12.1 g. of 2-(4-chlorophenoxy) - 2 - methylpropyl (3 - trifluoromethylphenoxy)(4-chlorophenyl)acetate ($n_D^{25}$=1.5428).

Analysis.—Calculated for $C_{25}H_{21}Cl_2F_3O_4$ (percent): C, 58.49; H, 4.12. Found (percent): C, 58.49; H, 4.34.

EXAMPLE 9

(3-trifluoromethylphenoxy)(4-chlorophenyl)acetylglycine and cyclohexylamine salt A solution of glycine (3.75 g., 0.05 mole) in 75 ml. of water containing 2.0 g. (0.05 mole) of sodium hydroxide is cooled to 5° C. A solution of (3-trifluoromethylphenoxy)(4-chlorophenyl)acetyl chloride (17.5 g., 0.05 mole) in sufficient tetrahydrofuran to yield 50 ml. and, also, a solution of sodium hydroxide (2.0 g., 0.05 mole) in sufficient water to yield 50 ml., are added to the glycine solution simultaneously over a 40-minute period. The mixture is stirred at 5° C. for an additional hour and then for 1.5 hours at room temperature. Water (75 ml.) is added and dilute hydrochloric acid is used to adjust the reaction to pH 4. The product is extracted from the acidified reaction mixture with three 150 ml. portions of ether and the ether extracts combined and washed by extraction with water. The ether solution is then dried over anhydrous sodium sulfate and the ether is evaporated under reduced pressure. A viscous oily residue of (3-trifluoromethylphenoxy)(4 - chlorophenyl)acetylglycine is obtained.

The cyclohexylamine salt of the product is prepared by adding an equivalent quantity of cyclohexylamine to an ether solution of the (3-trifluoromethylphenoxy)(4-chlorophenyl)acetylglycine. A crystalline product is obtained which is recrystallized successively from ethyl acetate and then from n-butyl chloride to yield 8.3 g. of purified (3-trifluoromethylphenoxy)(4 - chlorophenyl)acetylglycine, cyclohexylamine salt, M.P. 133.5–136.5° C.

Analysis. — Calculated for $C_{17}H_{13}ClF_3NO_4 \cdot C_6H_{13}N$ (percent): C, 56.73; H, 5.38; N, 5.75; Found (percent): C, 56.78; H, 5.13; N, 5.69.

EXAMPLE 10

N-(2-acetoxyethyl)(3-trifluoromethylphenoxy)(4-chlorophenyl)acetamide

By substituting 2-acetoxyethylamine for the glycine of Example 9 and following the procedure described therein the product N-(2-acetoxyethyl)(3 - trifluoromethylphenoxy)(4-chlorophenyl)acetamide is obtained.

EXAMPLE 11

N-(2-diethylaminoethyl)(3-trifluoromethylphenoxy)(4-chlorophenyl)acetamide and citrate salt A solution of (3-trifluoromethylphenoxy)(4-chlorophenyl)acetyl chloride (9.8 g., 0.028 mole) in 25 ml. of ether is added dropwise over a 30-minute period to a solution of 2-diethylaminoethylamine (3.5 g., 0.029 mole) in 75 ml. of ether at 5° C. After being stirred an additional 30 minutes at 5° C., the reaction is stirred for 16 hours at room temperature. Aqueous sodium bicarbonate is added to the reaction mixture and the ether layer is removed. The aqueous layer is extracted twice with 100 ml. portions of ether and the ether extracts are combined, washed by extraction with water, dried over anhydrous sodium sulfate and evaporated under reduced pressure. The residue, a viscous oil, is identified at N-(2-diethylaminoethyl)(3 - trifluoromethylphenoxy)(4 - chlorophenyl)acetamide.

The citrate salt of the product is prepared by adding an ethanol solution of a molecular equivalent quantity of citric acid to an ether solution of the N-(2-diethylaminoethyl)(3 - trifluoromethylphenoxy)(4 - chlorophenyl)acetamide. A crystalline salt is obtained which, upon purification by recrystallization from water, yields crystalline N - (2 - diethylaminoethyl)(3-trifluoromethylphenoxy)(4-chlorophenyl)acetamide, citrate salt in the form of the monohydrate, M.P. 87.5–89.5° C.

Analysis.—Calculated for

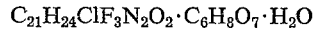

$C_{21}H_{24}ClF_3N_2O_2 \cdot C_6H_8O_7 \cdot H_2O$ (percent): C, 50.75; H, 5.36; N, 4.38. Found (percent): C, 50.97; H, 5.04; N, 4.40.

EXAMPLE 12

N-(2-chloroethyl)(3-trifluoromethylphenoxy)(4-chlorophenyl)acetamide

A solution of sodium hydroxide (3.2 g., 0.08 mole) in 20 ml. of water is added over a 30-minute period to a well-stirred mixture of dioxane (100 ml.), (3-trifluoromethylphenoxy)(4-chlorophenyl)acetyl chloride (13.96 g., 0.04 mole) and 2-chloroethylamine hydrochloride (4.64 g., 0.04 mole) at 10° C. The mixture is stirred for four hours at room temperature and is then added to 600 ml. of water. The ether layer is removed and the aqueous solution is extracted four times with 125 ml. of ether. The ether extracts are then combined, thoroughly washed by extraction with water and the ether removed by evaporation at reduced pressure. A crystalline residue (7.3 g.), M.P. 68–81° C. is obtained which, after successive recrystallizations from methylcyclohexane and isopropyl ether yields 2.5 g. of N-(2-chloroethyl)(3-trifluoromethylphenoxy)(4-chlorophenyl)acetamide, M.P. 89–91° C.

Analysis.—Calculated for $C_{17}H_{14}Cl_2F_3NO_2$ (percent): C, 52.06; H, 3.60; N, 3.57. Found (percent): C, 51.98; H, 3.80; N, 3.51.

EXAMPLE 13

N-(2-hydroxyethyl)(3 - trifluoromethylphenoxy)(4-chlorophenyl)acetamide and N-(2-acetoxyethyl)(3-trifluoromethylphenoxy)(4-chlorophenyl)acetamide Step A: N-(2-hydroxyethyl)(3-trifluoromethylphenoxy)(4-chlorophenyl)acetamide.—A solution of (3-trifluoromethylphenoxy)(4-chlorophenyl)acetyl chloride (12.69 g., 0.036 mole) in 25 ml. of ether is added to a solution of ethanolamine (4.43 g., 0.0725 mole) in 80 ml. of dioxane at 10° C. over a 30-minute period. The reaction is stirred at 10° C. for 30 minutes and then at room temperature for 16 hours. Water (600 ml.) is added and the mixture is extracted three times with 100 ml. portions of ether. The extracts are combined, washed by extraction with water, dried over anhydrous sodium sulfate and evaporated under reduced pressure. The N-(2-hydroxyethyl)(3-trifluoromethylphenoxy)(4 - chlorophenyl)acetamide thus obtained is in the form of an oil.

Step B: N - (2- acetoxyethyl)(3 - trifluoromethylphenoxy)(4 - chlorophenyl)acetamide.—The N-(2-hydroxyethyl)(3 - trifluoromethylphenoxy)(4 - chlorophenyl)acetamide obtained in Step A is dissolved in 100 ml. of ether and 3.4 ml. (0.0415 mole) of pyridine is added. The solution is cooled to 5° C. and acetyl chloride (3.13 g., 0.04 mole) in 25 ml. of ether is added over a 20-minute period and the reaction stirred for 1.5 hours at room temperature. Ether (100 ml.) is added to the reaction mixture and it is then extracted three times with 100 ml. of water. The ether solution is dried over anhydrous sodium sulfate and then evaporated under reduced pressure. The crystalline residue (12.6 g., M.P. 78–83° C.) thus obtained then is recrystallized from n-butyl chloride to give N-(2-acetoxyethyl)(3-trifluoromethylphenoxy)(4 - chlorophenyl)acetamide, M.P. 90.5–91.5° C.

Analysis.—Calculated for $C_{19}H_{17}ClF_3NO_4$ (percent): C, 54.88; H, 4.12; N, 3.37. Found (percent): C, 55.08; H, 4.17; N, 3.33.

EXAMPLE 14

N-(3-hydroxypropyl)(3-trifluoromethylphenoxy)(4-chlorophenyl)acetamide and N-(3-acetoxypropyl)(3-trifluoromethylphenoxy)(4-chlorophenyl)acetamide By substituting 3-aminopropanol for the ethanolamine of Example 13, Step A, and following the procedure described in Steps A and B of that example, the products N-(3-hydroxypropyl)(3-trifluoromethylphenoxy)(4-chlorophenyl)acetamide and N-(3-acetoxypropyl)(3-trifluoromethylphenoxy)(4-chlorophenyl)acetamide are obtained.

EXAMPLE 15

(3-trifluoromethylphenoxy)(4-chlorophenyl)acetylurea

A solution of (3 - trifluoromethylphenoxy)(4-chlorophenyl)acetyl chloride (12.69 g., 0.036 mole) in 20 ml. of benzene is added over a 15-minute period to a refluxing solution of urea (2.47 g., 0.042 mole) in benzene (20 ml.) containing 2 drops of concentrated sulfuric acid. Refluxing is continued for 3.5 hours and then the solvent is removed by concentration under vacuum. The residue (13.5 g., M.P. 123–135° C.) is recrystallized from isopropyl alcohol to yield (3-trifluoromethylphenoxy)(4-chlorophenyl)acetylurea, M.P. 146–148° C.

Analysis.—Calculated for $C_{16}H_{12}ClF_3N_2O_3$ (percent): C, 51.55; H, 3.25; N, 7.52. Found (percent): C, 51.81; H, 3.41; N, 7.48.

EXAMPLE 16

N-ethoxycarbonyl(3-trifluoromethylphenoxy)-(4-chlorophenyl)acetamide

A mixture of urethane (3.7 g., 0.04 mole) and (3-trifluoromethylphenoxy) (4 - chlorophenyl)acetyl chloride (13.96 g., 0.04 mole) is heated for three hours at 100–105° C. in a flask protected from atmospheric moisture. The reaction mixture is cooled to room temperature and 25 ml. of petroleum ether is added, whereupon precipitation occurs and 12.0 g. of crystalline material, M.P. 123–131° C., is collected. Recrystallization from ethyl alcohol yields N-ethoxycarbonyl (3-trifluoromethylphenoxy)(4-chlorophenyl)acetamide, M.P. 142–144° C.

Analysis.—Calculated for $C_{18}H_{15}ClF_3NO_4$ (percent): C, 53.81; H, 3.76; N, 3.49. Found (percent): C, 53.87; H, 3.62; N, 3.44.

EXAMPLE 17

Benzyl (3-trifluoromethylphenoxy)(4-chlorophenyl)-acetate (3-trifluoromethylphenoxy)(4-chlorophenyl)acetic acid (20.0 g., 0.0757 mole) and thionyl chloride (40 ml.) are charged into a round-bottom flask equipped with a reflux condenser. The mixture is heated at reflux for 0.5 hour, cooled and excess thionyl chloride removed by vacuum distillation. Benzene (100 ml.) and benzyl alcohol (17 mL) are added and the resulting mixture is refluxed for 45 minutes. The mixture then is cooled to room temperature and the solution washed with 100 ml. of sodium bicarbonate and twice with 100 ml. of water. The resulting organic layer then is dried over anhydrous sodium sulfate and evaporated to an oil. The resulting oil is dissolved in 100 ml. of absolute ethanol whereupon it crystallizes on standing to yield 24.3 g. (76.5%) of benzyl (3-trifluoromethylphenoxy)(4-chlorophenyl)acetate, M.P. 90–91.5° C.

Analysis.—Calculated for $C_{22}H_{16}ClF_3O_3$ (percent): C, 62.79; H, 3.83; Cl, 8.43. Found (percent): C, 62.93; H, 3.93; Cl, 8.57.

EXAMPLE 18

Benzyl l-(3-trifluoromethylphenoxy)(4-chlorophenyl)-acetate

Step A: d-(3-trifluoromethylphenoxy)(4-chlorophenyl)-acetic acid, cinchonidine salt.—dl-(3-trifluoromethylphenoxy)(4-chlorophenyl)acetic acid (100 g., 0.303 mole) and cinchonidine alkaloid (89.3 g., 0.303 mole) are added to 2000 ml. of isopropyl alcohol at room temperature. Crystallization of the salt begins in a few minutes. The temperature is then raised to reflux (83° C.) and the mixture is cooled ambiently to 55° C. whereupon it is aged for two hours. The crystalline material which results is collected, washed with 200 ml. of hot isopropyl alcohol and dried to yield 110 g. of crude cinchonidine salt, M.P. 204–206° C. (The mother liquor thus obtained is used in Steps C and D of this example for the preparation of l-(3-trifluoromethylphenoxy)(4 - chlorophenyl)acetic acid.) The crude cinchonidine salt is slurried with 2000 ml. of ethyl alcohol and 400 ml. of methyl alcohol at reflux and then stirred and cooled ambiently overnight. After collection by filtration and washing with 200 ml. of ethyl alcohol, the product is air-dried at 60° C. to a constant weight of 69.2 g., M.P. (dec.) 213–214° C., $[\alpha]_D$—30.2° (c.=0.5 in methyl alcohol). Recrystallization of 58 g. from 1800 ml. of ethyl alcohol yields 43.1 g. of pure d-(3-trifluoromethylphenoxy)(4-chlorophenyl)acetic acid, cinchonidine salt, M.P. (dec.) 216–217° C., $[\alpha]_D$—29.8° (c.=0.5 in methyl alcohol).

Step B: d-(3-trifluoromethylphenoxy)(4 - chlorophenyl)acetic acid.—The d - (3 - trifluoromethylphenoxy)(4-chlorophenyl)acetic acid, cinchonidine salt (7.1 g.) of Step A is added to a mixture of 200 ml. of ether, 200 ml. of water and 4 ml. of concentrated sulfuric acid. The layers are separated and the ether solution is washed three times with 200 ml. of water. After drying, the ether solution is evaporated and the oil is crystallized from 25 ml. of methylcyclohexane to yield 2.95 g. of d-(3-trifluoromethylphenoxy)(4-chlorophenyl)acetic acid, M.P. 98–100.5° C., $[\alpha]_D$+95.3° (c.=0.5 in methyl alcohol).

Step C: l-(3-trifluoromethylphenoxy)(4-chlorophenyl)-acetic acid, cinchonidine salt.—The mother liquor from the crude d-(3-trifluoromethylphenoxy)(4-chlorophenyl)-acetic acid, cinchonidine salt isolated in Step A is heated to effect complete solution and then cooled ambiently. The small amount of solid which is present at 30° C. is removed by filtration, the clear filtrate is stirred at room temperature overnight and the crystalline precipitate thus obtained is collected by filtration and washed with 200 ml. of isopropyl alcohol to yield 58.8 g. of l-(3-trifluoromethylphenoxy)(4-chlorophenyl) acetic acid, cinchonidine salt, M.P. (dec.) 200–201° C., $[\alpha]_D$—94.7° (c.=0.5 in methyl alcohol). The product (43.8 g.) is recrystallized from isopropyl alcohol (800 ml) to give 37.3 g. of pure l-(3-trifluoromethylphenoxy)(4-chlorophenyl)acetic acid, cinchonidine salt, M.P. (dec.) 200.5–201.5° C., $[\alpha]_D$—95.5° (c.=0.5 in methyl alcohol).

Step D: l - (3 - trifluoromethylphenoxy)(4 - chlorophenyl)acetic acid.—Pure l-(3-trifluoromethylphenoxy)(4-chlorophenyl)acetic acid, cinchonidine salt (5.9 g.)

from Step C is converted in essentially the same manner, as described in Step B for the corresponding d-acid, to pure 1-(3-trifluoromethylphenoxy)(4-chlorophenyl)acetic acid, 2.7 g., M.P. 98–100° C., [α]$_D$ —99° (c.=0.5 in methyl alcohol).

Step E: Benzyl 1-(3-trifluoromethylphenoxy)(4-chlorophenyl)acetate.—1 - (3 - trifluoromethylphenoxy)(4-chlorophenyl)acetic acid (5.0 g., 0.0189 mole) and thionyl chloride (20 ml.) are placed in a round-bottom flask equipped with a reflux condenser. The mixture is refluxed for 20 minutes and excess thionyl chloride is removed under vacuum on a steam bath. Benzene (20 ml.) is added to the oily residue and evaporated under vacuum, followed by the addition of benzene (20 ml.) and benzyl alcohol (4 ml.). The mixture thus obtained is refluxed for 45 minutes, the mixture is cooled to room temperature and 80 ml. of ether is added and the mixture washed twice with 300 ml. of saturated sodium bicarbonate and twice with 300 ml. of water. The organic layer which results is dried over anhydrous magnesium sulfate, filtered and evaporated under vacuum to an oil. The oil is dissolved in absolute ethanol (20 ml.) and cooled to —20° C. The crystalline product thus obtained is filtered off at —20° C., washed with 1 ml. of absolute ethanol (maintained at —30° C.) and dried under vacuum to constant weight to yield 4.7 g. (73.8%) of benzyl 1-(3-trifluoromethylphenoxy)(4-chlorophenyl)acetate, M.P. 46–47.5° C., [α]$_D^{25}$ +41.8° (c.=0.5 in methyl alcohol).

EXAMPLE 19

Benzyl d-(3-trifluoromethylphenoxy)(4-chlorophenyl)acetate d - (3 - trifluoromethylphenoxy)(4-chlorophenyl)acetic acid (5.0 g., 0.0189 mole) and thionyl chloride (20 ml.) are placed in a round-bottom flask equipped with a reflux condenser, the mixture refluxed for 20 minutes and excess thionyl chloride removed by evaporation on a steam bath under vacuum. Benzene (20 ml.) is added to the oily residue and evaporated by vacuum distillation and to the mixture is added benzene (20 ml.) and benzyl alcohol (4 ml.). The mixture then is refluxed for 45 minutes and the mixture cooled to room tempertare and diethyl ether (80 ml.) is added. The solution then is washed twice with 300 ml. of saturated sodium bicarbonate and twice with 300 ml. of water. The ether solution is dried over anhydrous magnesium sulfate, the drying agent filtered off and the solution evaporated to an oil. The resulting oil is dissolved in absolute ethanol (20 ml.) and cooled to —20° C. The product thus obtained is filtered off at —20° C. and washed with 1 ml. of absolute ethanol (maintained at a temperature of —30° C.) and dried under vacuum at 30° C. to a constant weight to yield 2.1 g. (33%) of benzyl d - (3 - trifluoromethylphenoxy)(4-chlorophenyl)acetate, M.P., 46–47.5° C., [α]$_D$ —42.3° (c.=0.5 in methyl alcohol).

EXAMPLE 20

Acetamidoethyl 1-(3-trifluoromethylphenoxy)(4-chlorophenyl)acetate

Step A: d-(3-trifluoromethylphenoxy)(4-chlorophenyl) acetic acid, cinchonidine salt.—dl-(3-trifluoromethylphenoxy)(4-chlorophenyl)acetic acid (100 g., 0.303 mole) and cinchonidine alkaloid (89.3 g., 0.303 mole) are added to 2000 ml. of isopropyl alcohol at room temperature. Crystallization of the salt begins in a few minutes. The temperature is then raised to reflux (93° C.) and the mixture is cooled ambiently to 55° C. whereupon it is aged for two hours. The crystalline material which results is collected, washed with 200 ml. of hot isopropyl alcohol and dried to yield 110 g. of crude cinchonidine salt, M.P. 204–206° C. (The mother liquor thus obtained is used in Steps C and D of this example for the preparation of 1-(3-trifluoromethylphenoxy)(4-chlorophenyl)acetic acid.) The crude cinchonidine salt is slurried with 2000 ml. of ethyl alcohol and 400 ml. of methyl alcohol at reflux and then stirred and cooled ambiently overnight. After collection by filtration and washing with 200 ml. of ethyl alcohol, the product is air-dried at 60° C. to a constant weight of 69.2 g., M.P. (dec.) 213–214° C., [α]$_D$ —30.2° (c.=0.5 in methyl alcohol). Recrystallization of 58 g. from 1800 ml. of ethyl alcohol yields 43.1 g. of pure d-(3-trifluoromethylphenoxy)(4-chlorophenyl)acetic acid, cinchonidine salt, M.P. (dec.) 216–217° C., [α]$_D$ —29.8° (c.=0.5 in methyl alcohol).

Step B: d-(3-trifluoromethylphenoxy)(4-chlorophenyl-acetic acid.—The d-(3-trifluoromethylphenoxy)(4-chlorophenyl)acetic acid, cinchonidine salt (7.1 g.) of Step A is added to a mixture of 200 ml. of ether, 200 ml. of water and 4 ml. of concentrated sulfuric acid. The layers are separated and the ether solution is washed three times with 200 ml. of water. After drying, the ether solution is evaporated and the oil is crystallized from 25 ml. of methylcyclohexane to yield 2.95 g. of d-(3-trifluoromethylphenoxy)(4-chlorophenyl) acetic acid, M.P. 98–100.5° C., [α]$_D$ +95.3° (c.=0.5 in methyl alcohol).

Step C: 1-(3-trifluoromethylphenoxy)(4-chlorophenyl) acetic acid, cinchonidine salt.—The mother liquor from the crude d-(3-trifluoromethylphenoxy)(4-chlorophenyl) acetic acid, cinchonidine salt isolated in Step A is heated to effect complete solution and then cooled ambiently. The small amount of solid which is present at 30° C. is removed by filtration; the clear filtrate is stirred at room temperature overnight and the crystalline precipitate thus obtained is collected by filtration and washed with 200 ml. of isopropyl alcohol to yield 58.8 g. of 1-(3-trifluoromethylphenoxy)(4-chlorophenyl)acetic acid, cinchonidine salt, M.P. (dec.) 200–201° C.,[α]$_D$ —94.7° (c.=0.5 in methyl alcohol). The product (43.8 g.) is recrystallized from isopropyl alcohol (800 ml.) to give 37.3 g. of pure 1 - (3 - trifluoromethylphenoxy)(4 - chlorophenyl)acetic acid, cinchonidine salt, M.P. (dec.) 200.5–201.5° C., [α]$_D$ —95.5° (c.=0.5 in methyl alcohol).

Step D: 1-(3-trifluoromethylphenoxy)(4-chlorophenyl) acetic acid.—Pure 1-(3-trifluoromethylphenoxy)(4-chlorophenyl)acetic acid, cinchonidine salt (5.9 g.) from Step C is converted in essentially the same manner as described in Step B for the corresponding d-acid, to pure 1-(3-trifluoromethylphenoxy)(4-chlorophenyl)acetic acid, 2.7 g., M.P. 98–100° C., [α]$_D$ —99° (c.=0.5 in methyl alcohol).

Step E: Acetamidoethyl 1-(3-trifluoromethylphenoxy) (4-chlorophenyl)acetate. — 1-(3-trifluoromethylphenoxy) (4-chlorophenyl)acetic acid (11.45 g., 0.0346 mole) and thionyl chloride (23 ml.) are placed in a flask equipped with a reflux condenser and the mixture heated at reflux for 20 minutes. Excess thionyl chloride is removed by vacuum distillation on a steam bath and benzene (30 ml.) is added and evaporated under vacuum. The crude 1-(3-trifluoromethylphenoxy)(4 - chlorophenyl) acetic acid chloride thus obtained is dissolved in ether (40 ml.) and to the resulting solution is added 2-acetamidoethanol (5.3 g., 0.0522 mole; maintained at a temperature of less than 5° C.) in dimethylformamide (150 ml.) and pyridine (4.6 ml.). The solution then is allowed to warm to room temperature and stirred for approximately 16 hours. Water (300 ml.) and diethyl-ether (100 ml.) are added and the solution is stirred. The water layer is separated and extracted with two 100 ml. portions of ether and the ether extracts combined, washed with three 100 ml. portions of water and then dried over anhydrous magnesium sulfate. The dried ether solution is evaporated to an oil, the oil is dissolved in isopropyl alcohol (10 ml.) and then refrigerated at —20° C. for 72 hours. The resulting slurry then is filtered at —20° C. and the resulting solid washed with isopropyl alcohol (10 ml.; maintained at —30° C.). The product thus obtained is dried for 36 hours at room temperature to constant weight to yield 3.3 g. (22.9%) of acetamido-ethyl 1-(3 - trifluoromethylphenoxy)(4 - chlorophenyl) acetate, M.P. 77–79° C., [α]$_D^{25}$ —54.8° (c.=0.5 in methyl alcohol).

EXAMPLE 21

Acetamidoethyl d-(3-trifluoromethylphenoxy)(4-chlorophenyl)acetate d-(3-trifluoromethylphenoxy)(4 - chlorophenyl)acetic acid (7.5 g., 0.0227 mole) and thionyl chloride (15 ml.) are placed in a flask equipped with a reflux condenser and heated at reflux for 20 minutes. Excess thionyl chloride is removed by vacuum distillation on a steam cone and then benzene (20 ml.) is added and evaporated under vacuum. The crude d-(3-trifluoromethylphenoxy)(4-chlorophenyl)acetic acid chloride thus obtained is dissolved in 25 ml. of ether and the resulting solution is added to a solution of 2-acetamidoethanol (3.52 g., 0.0341 mole; maintained at a temperature below 5° C.) and pyridine (3.1 ml.). The solution then is allowed to warm to room temperature and stirred for approximately 16 hours. Water (300 ml.) and ether (100 ml.) are added and the solution is stirred. The water layer then is extracted twice with 100 ml. of ether and the ether extracts are combined, washed three times with 100 ml. of water and then dried over anhydrous magnesium sulfate. The dried ether solution then is evaporated under vacuum to an oil and the oil is dissolved in isopropyl alcohol (10 ml.) and refrigerated at $-20°$ C. for 72 hours. The resulting mixture is filtered at $-20°$ C. and the product thus obtained is washed with 10 ml. of isopropyl alcohol (maintained at $-30°$ C.). The product thus obtained is dried for 36 hours under vacuum at room temperature to yield 4.0 g. (42.3%) of acetamidoethyl d-(3 - trifluoromethylphenoxy)(4 - chlorophenyl) acetate, M.P. 77–79° C., $[\alpha]_D^{25}$ $+56.1°$ (c.=0.5 in methyl alcohol).

In a manner similar to that described in Example 1 for the preparation of 2-acetamidoethyl(3 - trifluoromethylphenoxy)(4-chlorophenyl)acetate, all of the products of this invention may be obtained. Thus, by substituting an appropriate 4-halophenylacetonitrile (III) and an appropriate alcohol or amine for the 4-chlorophenylacetonitrile and acetamidoethanol, Example 1, Steps A and F, respectively, and following substantially the procedure described in Steps A–F of that example, all of the (3-trifluoromethylphenoxy) (4-halophenyl) acetic acid esters and amides of this invention may be obtained. The following equation illustrates the reaction of Example 1, Steps A–F, and, together with Table I (infra), depict the 4-halophenylacetonitrile and alcohol or amine starting materials of the instant process and the corresponding products derived therefrom:

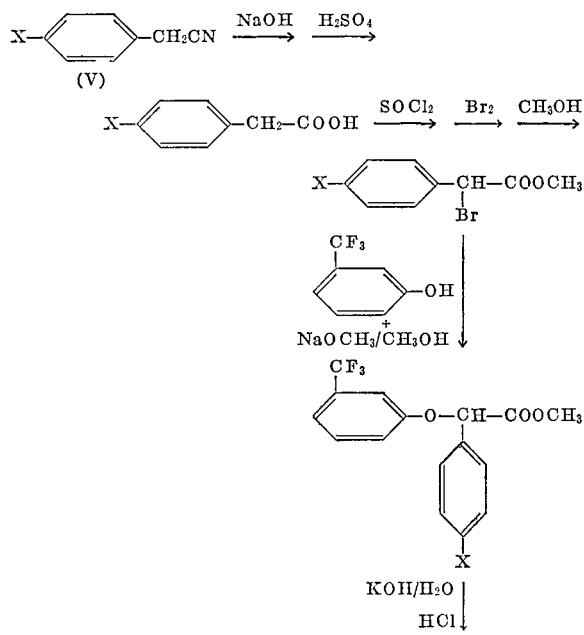

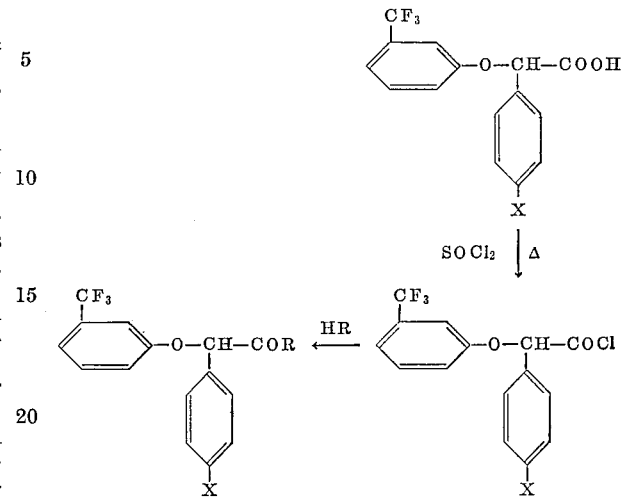

TABLE I

| Ex. | R | X |
|---|---|---|
| 22 | $-OCH_2-CH_2-N(CH_3)_2$ | Cl |
| 23 | $-OCH_2-CH_2-N(C_2H_5)_2 \cdot$ hydrochloride | Cl |
| 24 | $-OCH_2-CH_2-CH_2-N(C_2H_5)_2$ | Br |
| 25 | $-OCH_2-CH_2-NHCOH$ | Cl |
| 26 | $-OCH_2-CH_2-CH_2-CH_2-NHCOCH_3$ | Br |
| 27 | $-OCH_2-CH_2-CH_2-NHCO-\langle\rangle$ | Cl |
| 28 | $-OCH(CH_3)-CH_2-NHCONH_2$ | I |
| 29 | $-OCH_2-CH_2-CH_2-NHCONHC_2H_5$ | Cl |
| 30 | $-OCH_2-CH_2-CONH_2$ | F |
| 31 | $-OCH_2-CH_2-O-\langle\rangle-Cl$ | F |
| 32 | $-NH-CH_2-CH_2-COOH$ | I |
| 33 | $-NH-CH_2-CH_2-N(CH_3)_2 \cdot$ hydrochloride | Cl |
| 34 | $-NH-CH_2-CH_2-N(C_2H_5)_2 \cdot$ citrate | Cl |
| 35 | $-NH-CH_2-CH_2-CH_2-CH_2Cl$ | I |
| 36 | $-OCH_2-CH_2-NHCO-CH_2-CH_3$ | F |
| 37 | $-NHCOOCH_3$ | Cl |

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 50 mg. of an ester or amide of (3-trifluoromethylphenoxy) (4-halophenyl) acetic acid or a suitable acid addition salt thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made as elixirs or as injectable solutions by methods well known to pharmacists.

It is also within the scope of this invention to combine two or more of the compounds of this invention in a unit dosage form or to combine one or more of the compounds with other known hypocholesterolemics and hypolipemics or with other desired therapeutic and/or nutritive agents in dosage unit form.

The following example is included to illustrate the preparation of a representative dosage form:

EXAMPLE 38

Dry-filled capsules containing 50 mg. of active ingredient per capsule

| | Per capsule (mg.) |
|---|---|
| 2-acetamidoethyl (3-trifluoromethylphenoxy) (4-chlorophenyl)-acetate | 50 |
| Lactose | 144 |
| Magnesium stearate | 6 |
| Capsule size No. 3 | 200 |

The 2-acetamidoethyl (3-trifluoromethylphenoxy) (4-chlorophenyl)acetate is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the (3-trifluoromethylphenoxy) (4-halophenyl)acetic acid esters and amides (I) of this invention and their salt, ester and amide derivatives constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound having the formula:

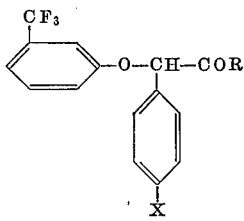

wherein R is a mononuclear lower aralkoxy, di-lower alkylamino-lower alkoxy, lower alkanamido-lower alkoxy, benzamido-lower alkoxy, ureido-lower alkoxy, N'-lower alkyl-ureido-lower alkoxy, carbamoyl-lower alkoxy, halophenoxy substituted lower alkoxy, carbamoyl substituted phenoxy, carboxy-lower alkylamino, N,N-di-lower alkylamino-lower alkylamino, halo substituted lower alkylamino, hydroxy substituted lower alkylamino, lower alkanolyloxy substituted lower alkylamino, ureido and lower alkoxycarbonylamino and X is halogen; and the non-toxic, pharmacologically acceptable salts thereof.

2. A compound having the formula:

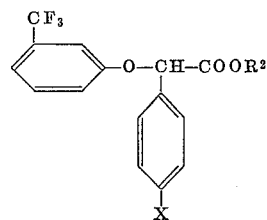

wherein $R^2$ is phenyl-lower alkyl, lower alkanamido-lower alkyl or benzamido-lower alkyl and X is halogen.

3. The compound of claim 2 where $R^2$ is phenyl-lower alkyl and X is chloro.

4. The compound of claim 2 wherein $R^2$ is lower alkanamido-lower alkyl and X is chloro.

5. The compound of claim 2 wherein $R^2$ is benzamido-lower alkyl and X is chloro.

6. The compound of claim 1 wherein R is di-lower alkylamino-lower alkoxy and X is chloro.

7. 2-acetamidoethyl (3 - trifluoromethylphenoxy) (4-chlorophenyl)acetate.

8. 2-benzamidoethyl (3 - trifluoromethylphenoxy) (4-chlorophenyl)acetate.

9. Benzyl (3-trifluoromethylphenoxy) (4-chlorophenyl)acetate.

10. N-2-diethylaminoethyl (3-trifluoromethylphenoxy)-(4-chlorophenyl)acetamide, citrate salt.

11. A compound having the formula:

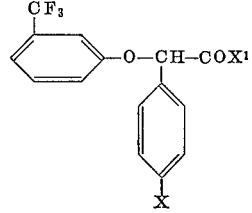

wherein X and $X^1$ are halogen.

12. The compounds of claim 11 wherein X and $X^1$ represent chloro.

References Cited

UNITED STATES PATENTS 3,106,564   10/1963   Fleming et al. _____ 260—559

OTHER REFERENCES

Morrison et al.: "Organic Chemistry," Allyn and Bacon, Boston, 1959, pp. 455–6, 474.

LORRAINE A. WEINBERGER, Primary Examiner

D. E. STENZEL, Assistant Examiner

U.S. Cl. X.R.

260—559, 544, 520, 501.17, 471, 490, 476, 515, 519; 424—308, 324